R. C. HUNGER.
SAW GAGE.
APPLICATION FILED MAY 13, 1916.
1,230,166.
Patented June 19, 1917.
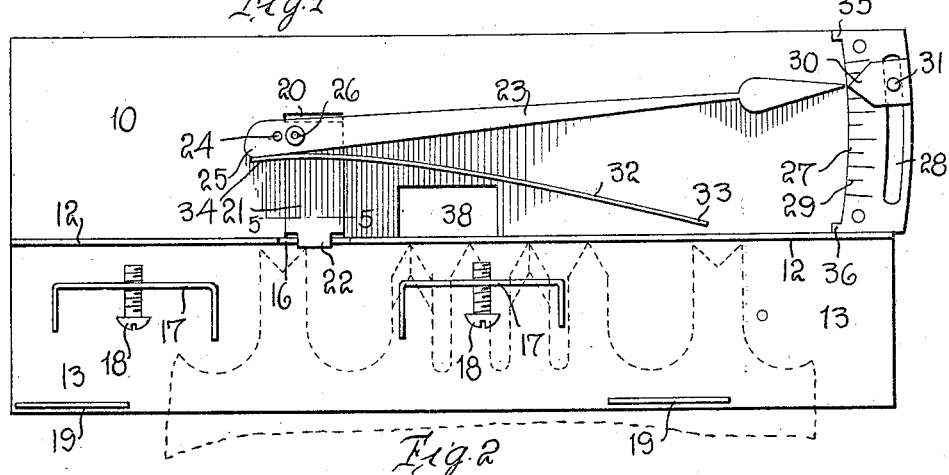
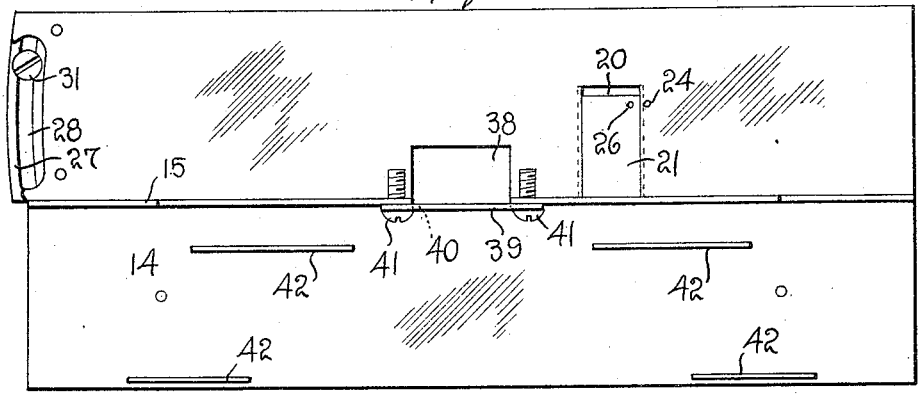
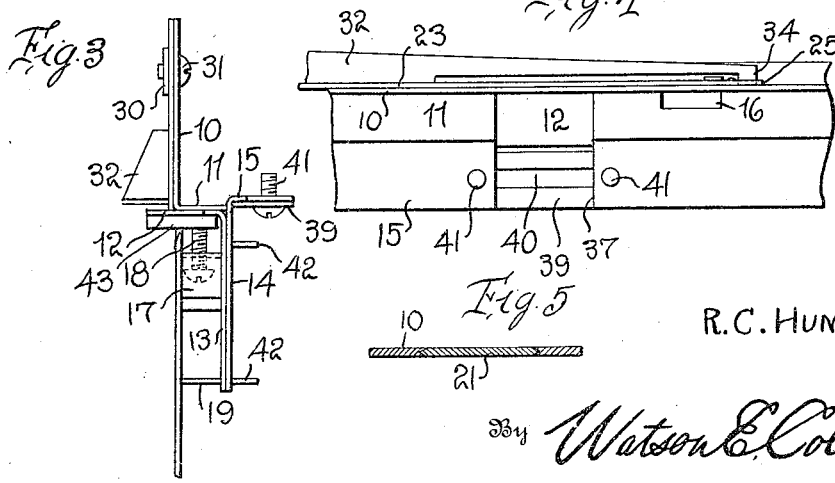
Inventor
R. C. HUNGER,
By Watson E. Coleman
Attorney

UNITED STATES PATENT OFFICE.

RICHARD C. HUNGER, OF MANNING, OREGON.

SAW-GAGE.

1,230,166.  Specification of Letters Patent.  Patented June 19, 1917.

Application filed May 13, 1916. Serial No. 97,393.

*To all whom it may concern:*

Be it known that I, RICHARD C. HUNGER, a citizen of the United States, residing at Manning, in the county of Washington and State of Oregon, have invented certain new and useful Improvements in Saw-Gages, of which the following is a specification, reference being had to the accompanying drawings.

This invention relates to saw gages, and its general object is to provide, in a single device, means for determining the length of raker teeth, means whereby the teeth may be filed to gage, and means for supporting the file so that the teeth may be jointed or topped.

A further object of the invention is to provide a saw gage having thereon a scale and a pointer moving over the scale and adapted to be operatively engaged by a raker tooth so as to indicate the length of the raker tooth, the pointer being so constructed that the movement of that portion of the pointer operatively engaged with the raker tooth is multiplied so that the movement of the end of the pointer upon the scale is relatively great, thus indicating clearly minute differences in length.

A further object of the invention is to provide an instrument of the character described having a filing opening and a saw tooth receiving opening coacting with each other so that the saw tooth which projects beyond the remainder of the teeth may be readily filed down to gage.

Other objects will appear in the course of the following description.

My invention is illustrated in the accompanying drawings, wherein:

Figure 1 is a face view of my improved raker tooth gage showing it in operation;

Fig. 2 is an opposite face view to that shown in Fig. 1;

Fig. 3 is an end elevation but showing a file held in place by the screws 18 and operating upon a saw blade;

Fig. 4 is a fragmentary top plan view; and

Fig. 5 is a section on the line 5—5 of Fig. 1.

Referring to these figures, it will be seen that this instrument comprises, in the form illustrated in the figures, a sheet or upper web of metal 10 which at its lower edge is angularly flanged as at 11 and abutted against the outwardly projecting flange 12, of a sheet or lower web of metal 13, the flange 12 projecting beyond the section 10. Attached to one face of the sheet 13 is a sheet of metal 14 which is laterally flanged, as at 15, this flange being directed oppositely to the flange 11. The flange 12 intermediate its ends is cut away, as at 16, and upon the plate 13, and disposed on each side of this cut-away portion 16 are the U-shaped ribs 17 which are mounted upon the plate 13 in any suitable manner, the edges of these flanges or ribs 17 being parallel to the plate and being on a level with each other. Passing through these flanges or ribs 17 are the screws 18. Disposed below the U-shaped flanges or ribs 17 are the outwardly projecting ribs or flanges 19 which also have exactly the same depth as the ribs 17. The outer edges of the ribs 17 and 19 are adapted to engage against the face of a cross-cut saw.

The plate 10, immediately above the slot or cut-away portion 16, is vertically slotted, as at 20, the side walls of the slot being V-shaped in section, and disposed in this slot is a slide 21 having a reduced lower end 22 formed with a flat lower edge, the side edges of the slide having grooves to receive the V-shaped faces of the side walls of the opening 20. Pivotally mounted upon the plate 10 is a relatively long pointer 23. This pointer is pivoted at 24 to the plate, and this pivot is located, as will be seen, just to one side of the opening 20, and it is to be noted that the pointer projects beyond the pivot 24, as at 25. The slide 21 is pivoted to the pointer at 26 so that the pivot 26 is relatively close to the pivot 24. Disposed at the other end of the plate 10 is an arcuate scale 27 which is formed with an arcuate slot 28. This scale 27 is provided with the graduations 29, and slidably mounted in connection with the slot 28 is an adjustable pointer or index member 30 which is held in place by means of a bolt and nut 31 and which is shiftable along the slide 28 so as to bring the point of the index member opposite any one of the graduations 29.

Mounted upon the face of the plate 10 is a spring 32. This is flat, slightly bowed, and is attached to the plate 10 for a distance from its butt end 33. This spring is cut away beneath the edge face of the pointer, see Fig. 4 but at its extremity is provided with a lug 34 which engages beneath the butt end 25 of the pointer, that is, that end of the pointer beyond the pivot 24. As a consequence, the free end of the spring always forces upward on the free end of the pointer and forces the head of the pointer downward against the stop 36 forming one end of the scale 27. When, however, the slide 21 is shifted upward to its full extent, the butt end of the pointer will press downward on the free end of the spring and the head of the pointer will move over the scale 27 until it strikes the stop 35. The full movement of the slide 21 in a full-sized gage will be about one-sixteenth of an inch whereas the pointer will move about an inch and three-quarters. It will therefore be obvious that the most delicate movement of the slide 21 will be indicated plainly by the pointer moving over the graduations 29.

The mechanism just described is particularly intended for determining the length of the raker teeth, and as a means whereby the teeth may be filed to gage, I provide the flange 15 which is cut away at its middle, as at 37, right opposite a square opening 38 formed in the plate 10, this opening extending downward to the face of the flange 15. Disposed across the slot or cut-away portion 37 is a plate 39 which is longitudinally slotted, as at 40, and this plate 39 is held to the flange 15 by means of screws 41. The face of the plate 14 is formed with the outwardly projecting ribs 42 all having the same depth and this depth being equal to the distance between the face of the plate 14 and the inner edge of the slot 40 so that when a saw is placed against the ribs 42 the saw will lie in the same plane as the slot 40.

In the practical use of my invention when it is desired to determine the length of the raker teeth and the saw, the blade is placed against the ribs 17 and 19 with the point of the raker tooth bearing against the slide 21, the cutting teeth bearing against the under faces of the flange 12 on each side of the slot or opening 16. Under these circumstances the length of the raker teeth will be plainly indicated by the pointer. In order to file the teeth to gage the saw is placed against the under side of the flange 15 with a raker tooth projecting through the slot 40. Now it will be noted that the upper face of the plate 39 is level with the under face of the flange 15 so that if the tooth is of the proper gage it will not project above the upper face of the member 40, and if it is too long it will so project and then by passing the file through the rectangular opening 38 this projection of the tooth will be filed away. Thus all the teeth may be made uniform. The screws 18 are for the purpose of clamping a file 43 in place against the flange 12 so that the file may be used for jointing or topping the teeth of saw A as in Fig. 3.

It will be seen that my invention is very simple, that it provides an instrument capable of a variety of uses, that it is particularly effective for the purpose intended. While I have illustrated a particular manner of making this instrument out of separate sheets, riveted or otherwise connected to each other, I wish it understood that the particular formation of the instrument may be changed without departing from the spirit of the invention.

Having described the invention, what I claim is:

1. A saw gage comprising a body having a flange cut away at one point and adapted to rest upon the teeth of a saw, saw supporting ribs mounted on the face of the body, a raker tooth-engaging member shiftably mounted on the body above the cut-away portion of the flange and resiliently urged through said opening of the flange, a pointer operatively mounted upon the body and operatively connected to the tooth engaging member, and a scale over which the pointer moves.

2. A saw gage comprising a body having a flange cut away at one point, the flange being adapted to rest upon the teeth of a saw to permit the projection of a raker tooth through the cut-away portion of the flange, a raker tooth-engaging member slidably mounted on the body above the flange and resiliently urged downward through the opening in the flange, a pointer pivotally mounted upon the body and pivotally connected to the sliding member, the pivotal connection of the pointer to the body and to the sliding member being adjacent each other, a scale mounted on the body over which the free end of the pointer moves, and an indicating member shiftable along said scale.

3. A saw gage comprising a body having a flange cut away at one point, the flange being adapted to rest upon the teeth of the saw to permit the projection of a raker tooth through the opening in the flange, the body having a vertical slot disposed above the opening in the flange, a slide mounted in said slot, a pointer pivotally mounted upon the body extending across the face thereof and pivotally connected to the slide, the butt end of the pointer extending beyond its pivotal connection with the body, a spring mounted upon the body, extending across the face of the slide and having its free end formed with a lug engaging beneath the butt end of the pointer whereby to urge the slide downward, and a scale over which the pointer moves.

4. A saw gage comprising a body having a flange cut away at one point, the flange being adapted to rest upon the teeth of a saw, a flat slotted plate disposed against the tooth contacting face of the flange and extending across said cut-away portion, the body having a rectangular file guiding opening disposed opposite said plate.

5. A body consisting of upper and lower webs and having an outwardly projecting flange at the intersection of said webs, the flange being cut away at its middle, the flange being adapted to rest against the edges of the saw teeth, a slotted plate disposed across the opening in the flange and bearing against the tooth contacting face thereof, the upper web having a file opening disposed in line with the slot of said plate and the lower web being formed with saw supporting ribs.

In testimony whereof I hereunto affix my signature in the presence of two witnesses.

RICHARD C. HUNGER.

Witnesses:
C. A. PETERSON,
E. O. SCOFIELD.

Copies of this patent may be obtained for five cents each, by addressing the "Commissioner of Patents, Washington, D. C."